Patented Apr. 3, 1951

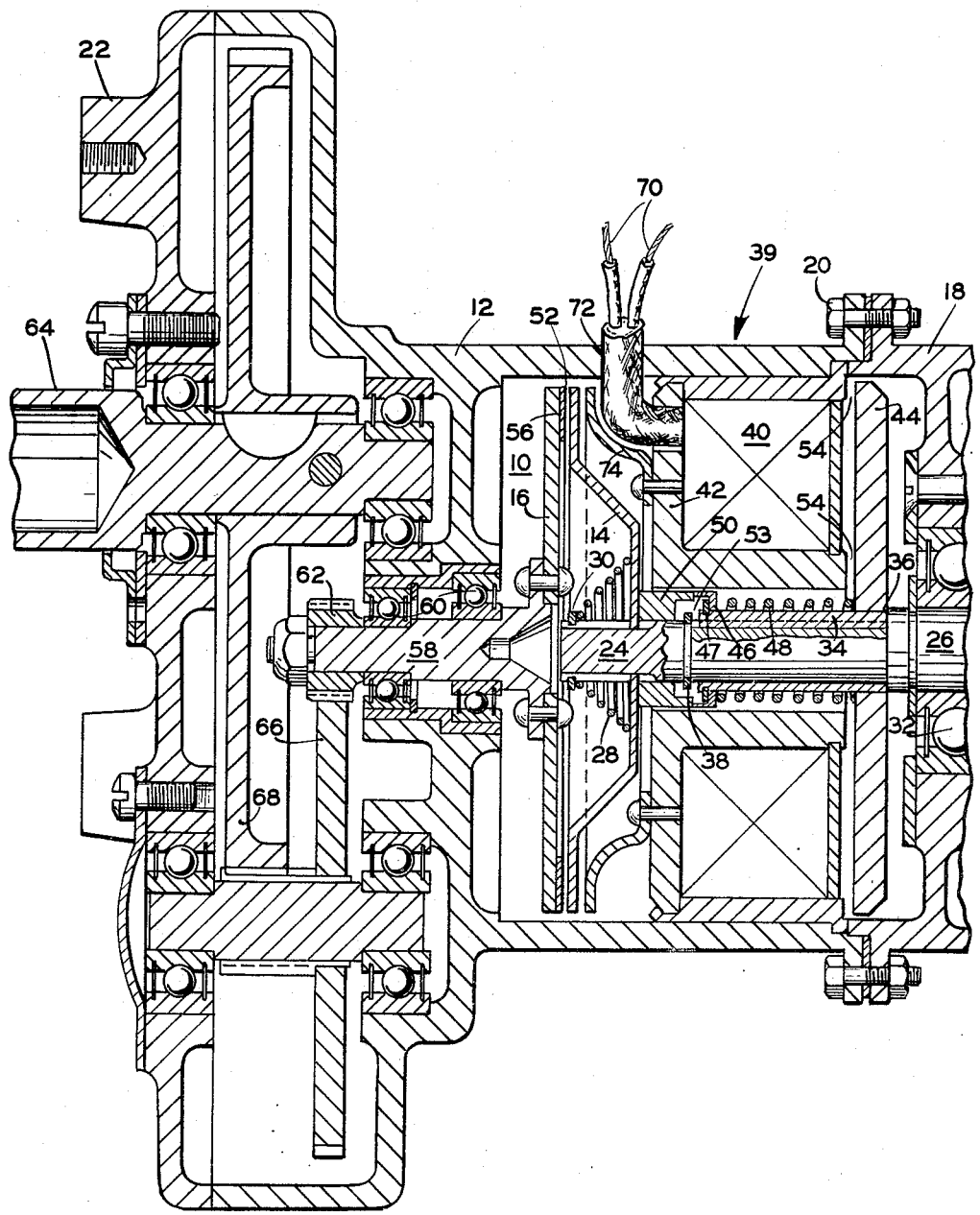

2,547,137

UNITED STATES PATENT OFFICE 2,547,137

ELECTROMAGNET OVERLOAD RELEASE CLUTCH

Leonard Ochtman, Ridgewood, N. J., assignor to Bendix Aviation Corporation, Teterboro, N. J., a corporation of Delaware Application December 6, 1948, Serial No. 63,659

1 Claim. (Cl. 192—84)

The present invention relates generally to actuators and more particularly to a clutch for actuators of the type adapted to operate a member such as a tab, flap or the like of an aircraft.

In actuators of this type, it is important that they have sufficient power to operate the member of the aircraft unfailingly under all conditions and to stop it accurately at each limiting position thereof and yet be of light weight and small size so as not to burden the aircraft unduly. In order to insure dependable operation over an extended period of time the operating parts of such actuators have often been made much heavier than necessary just to operate the member of the aircraft in order to withstand the heavy shock-load imposed thereon from absorbing the kinetic energy stored in the motor and associated parts during sudden stops and reversals of the actuators.

Among the objects of the present invention is to overcome the above-mentioned adverse features of the former devices indicated and to do so by novel and effective means.

Another object is to provide a novel clutch for actuators whereby the operating parts thereof may be made of a lighter construction relative to the motor than has heretofore been possible.

Another object is to provide a novel clutch for actuators whereby the rotating parts of the motor and associated parts are disconnected from the actuator proper when the motor is deenergized.

Still another object is to provide a novel and simple torque limiting clutch for actuators.

Still another object of this invention is to provide a novel clutch in which the clutch actuating force is transmitted through a spring thereby providing a substantially constant non-torque loading on the clutch member under all conditions thus providing constant torque limiting characteristics therefor.

The above and other objects and features of the invention will appear more fully hereinafter from a consideration of the following description taken in connection with the accompanying drawing wherein one embodiment of the invention is illustrated by way of example.

In the drawing the single figure is a view partly in section and partly in elevation of the driving unit comprising one embodiment of the novel clutch of the present invention.

Referring to the drawing, the structure shown comprises a clutch generally indicated at 10 enclosed by clutch housing 12 and having a driving member 14 and a driven member 16. Clutch housing 12 is secured to motor housing 18 as by bolts 20 and is provided with mounting pads 22. Clutch member 14 is splined to an extension 24 of the motor shaft 26 so as to rotate therewith but adapted to move axially thereon against the bias of spring 28 which is confined between the clutch member 14 and snap ring 30 which is fitted in a groove near the end of said extension. The motor shaft 26 is journaled in motor housing 18 as by ball bearing 32. A sleeve 34 is preferably splined to the extension 24, but axially movable thereon between shoulder 36 of the shaft 26 and snap ring 38 which is fitted in a groove in said extension. Surrounding a sleeve 34 is electromagnetic means 39 consisting of a coil 40 confined within an annular channel casing or core 42 securely mounted within clutch housing 12 and movable armature portion 44. The movable armature is made of a magnetic material and is securely mounted on non-magnetic sleeve 34 as shown. Surrounding sleeve 34 and slidably mounted thereon is a bell-shaped ring 46 which is biased against snap ring 47 as by a spring 48 surrounding sleeve 34 and pressed against armature portion 44. Slidingly fitting about motor shaft extension 24 is another bell-shaped ring 50 placed between clutch member 14 and bell-shaped ring 46. The bell-shaped ring 46 has an annular flange abutting an annular flange of the ring 50.

In the deenergized position of the clutch as shown the armature 44 and sleeve 34 are pressed against shoulder 36 by the biasing force of spring 28 against clutch driving member 14 which force is transmitted through the interaction of bell-shaped ring 50, bell-shaped ring 46 and spring 48 to armature 44. The cooperating parts are arranged so as to provide a relatively small gap 52 between the clutch members 14 and 16, a somewhat larger gap 53 between sleeve 34 and snap ring 38 and a still larger gap 54 between the armature 44 and the annular core 42, the purpose of which will be apparent as the description proceeds.

The driven member 16 of clutch 10 is provided with a friction facing ring 56 and is mounted on shaft 58 which is journaled within a clutch housing 12 as by a pair of ball bearings 60. Shaft 58 carries a pinion 62 which is adapted to drive output shaft 64 through a reduction gearing consisting of gears 66 and 68.

The lead-in wires 70 to coil 40 are connected in the motor circuit and enter through a hole 72 in the housing 12 and are protected from the revolving clutch member 14 as by an annular shield or guard 74 secured to the core 42.

In operation, with the motor and coil deenergized and the operating parts of the clutch assembly having a relative position as shown in the drawing, the movable armature 44 is pressed against shoulder 36 of motor shaft 26 by the biasing action of the relatively weak spring 28 against clutch driving member 14 which bias is transmitted to the armature 44 through the interaction of the bell-shaped ring 50, bell-shaped ring 46, relatively strong spring 48, and sleeve 34 on which armature 44 is fixedly mounted.

When the motor is energized for operation the actuator coil 40 which is connected in circuit therewith is also energized. Energization of coil 40 sets up a flux through the annular core member 42 and movable armature 44 and will exert a force on the latter and move it toward the left as seen in the drawing. This force will be transmitted through sleeve 34, relatively strong spring 48, rings 46 and 50 to clutch driving member 14 which will be forced into driving engagement with the friction surface of the ring 56 of the driven clutch member 16 against the biasing force of the relatively weak spring 28. This closes gap 52 and reduces gaps 53 and 54 correspondingly. Further movement of the armature 44 to the left will cause bell-shaped ring 46 to slide on the sleeve 34 against the bias of the relatively strong spring 48 until sleeve 34 has moved up against snap ring 38 and closes gap 53. The gaps are so proportioned that when gaps 52 and 53 are completely closed gap 54 is still sufficiently large to provide a running clearance between core member 42 and armature 44. Thus the force by which the clutch member 14 is pressed against clutch member 16 is determined by the relative stiffness of springs 48 and 28 and is independent of the strength of the electromagnetic means 39 which may vary over a considerable range due to voltage and temperature variations. By this described arrangement, the maximum torque necessary to make the clutch slip may be determined very accurately and may be set so as to slip at a predetermined maximum torque, whereby the actuator mechanism will be protected against excessive and destructive application of force should the operating mechanism or the member of the aircraft to be operated, for some reason, fail to function properly or if the limit switches should fail to open the circuit at the proper moment. This arrangement provides a constant pressure between the friction surfaces even after considerable wear thereof and makes it possible to assemble the parts with less accuracy than has heretofore been possible without thereby sacrificing any of the effectiveness of the clutch.

The instant the motor and thereby the electromagnetic means 39 is deenergized as by the action of the limit switches or by the operator, the clutch surfaces will immediately separate and disconnect the motor and clutch mechanism which can coast free until they stop without transfer of energy to the actuator mechanism. Thus the gearing does not have to absorb the kinetic energy stored in the motor armature and the clutch mechanism and may be made of lighter construction relative to the driving motor than has heretofore been possible.

Although only one embodiment of the invention has been illustrated and described, various changes in the form and relative arrangements of the parts may be made to suit requirements.

What is claimed is:

An actuator clutch comprising, in combination, a driven clutch member having a friction surface, a relatively movable clutch member having a friction surface adapted to engage said first mentioned friction surface, said movable clutch member being axially slidably mounted on a motor shaft so as to rotate therewith, spring means surrounding said shaft adapted to urge said movable clutch member axially on said shaft out of driving engagement with said driven clutch member, a sleeve surrounding said shaft and axially slidable relative thereto between a shoulder on said shaft and a stop ring spaced from said shoulder and mounted on said shaft, electromagnetic means surrounding said shaft and including a stationary portion and a movable armature normally spaced apart, said armature being securely mounted on said sleeve adjacent the end thereof abutting said shoulder, a snap ring mounted on said sleeve adjacent the other end of said sleeve, a first bell-shaped ring slidably fitting about said sleeve, a spring stronger than the first mentioned spring to normally urge said bell-shaped ring against the sleeve snap ring, and a second bell-shaped ring member surrounding said shaft and abutting the first bell-shaped ring and the movable clutch member in such a manner that the first mentioned spring means urging said movable driving clutch member away from said driven clutch member urges said sleeve and the armature mounted thereon against said shoulder through the intermediary of said movable clutch member, second bell-shaped ring, first bell-shaped ring and said relatively strong spring thereby providing a gap between said driven and driving clutch members, a gap between said shaft snap ring and said sleeve larger than said first mentioned gap, and a gap between said armature and said stationary portion of said electromagnetic means larger than the aforementioned gaps.

LEONARD OCHTMAN.

REFERENCES CITED

The following references are of record in the file of this patent:

UNITED STATES PATENTS

| Number | Name | Date |
|---|---|---|
| 2,069,876 | Dorsett | Feb. 9, 1937 |
| 2,464,129 | Goettisheim | Mar. 8, 1949 |
| 2,465,601 | Ochtman | Mar. 29, 1949 |

FOREIGN PATENTS

| Number | Country | Date |
|---|---|---|
| 474,053 | France | Oct. 31, 1914 |
| 217,088 | Switzerland | Sept. 30, 1941 |